June 2, 1964 P. H. MERDINYAN 3,135,332
SEALING MEANS FOR VALVES
Filed May 18, 1962 2 Sheets-Sheet 1

INVENTOR.
PHILIP H. MERDINYAN
BY Martin D. Wittstein
ATTORNEY

June 2, 1964     P. H. MERDINYAN     3,135,332
SEALING MEANS FOR VALVES
Filed May 18, 1962     2 Sheets-Sheet 2
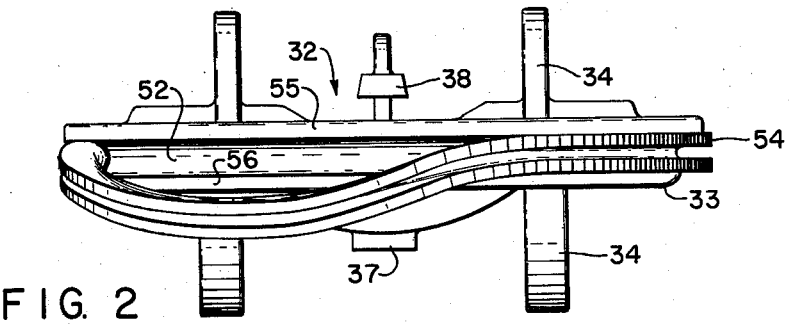
FIG. 2
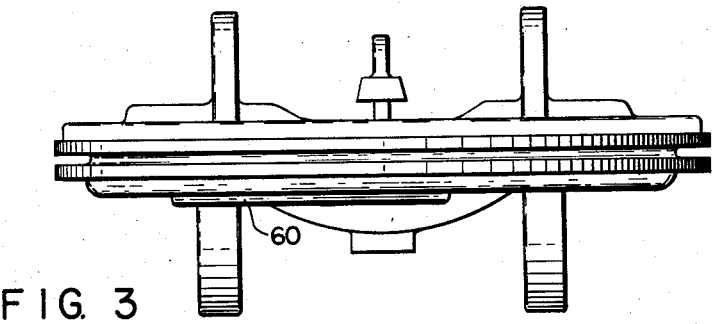
FIG. 3
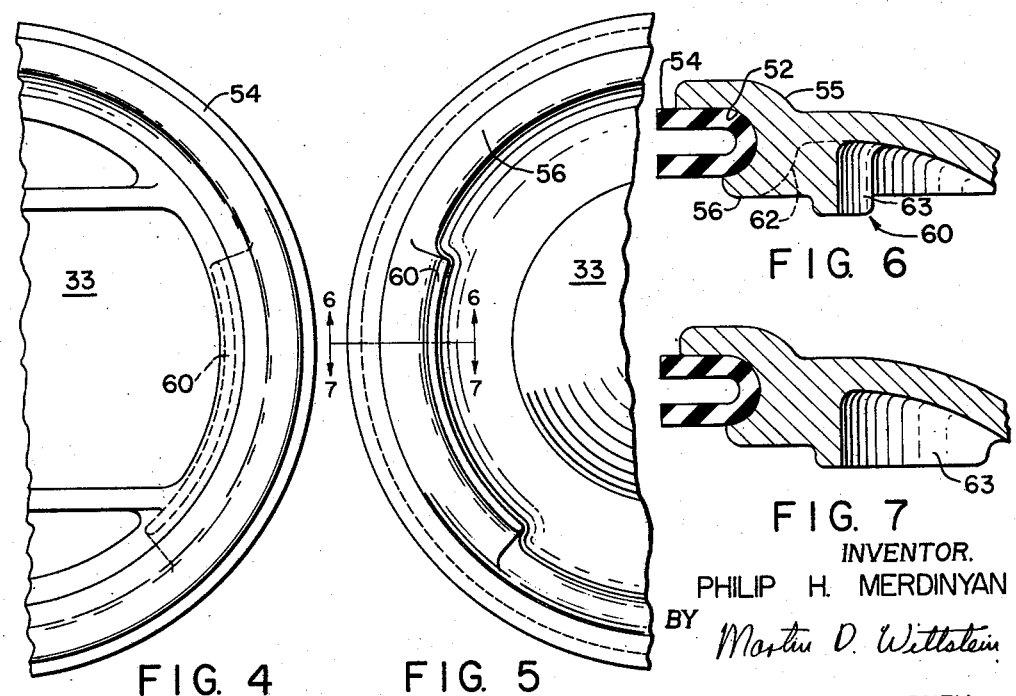
FIG. 4     FIG. 5     FIG. 6
FIG. 7
INVENTOR.
PHILIP H. MERDINYAN
BY Martin D. Wittstein
ATTORNEY

United States Patent Office 3,135,332
Patented June 2, 1964

3,135,332
SEALING MEANS FOR VALVES
Philip H. Merdinyan, East Greenwich, R.I., assignor to Grinnell Corporation, Providence, R.I., a corporation of Delaware
Filed May 18, 1962, Ser. No. 195,699
10 Claims. (Cl. 169—22)

This invention relates to improvements in valves, and finds particular utility in dry pipe valves for use with fire protection sprinkler systems.

In the field of fire protection sprinkler systems, it is frequently desirable to use a dry pipe installation wherein all the piping from a predetermined point to the sprinkler heads is maintained dry or free of water. By so doing, the problem of ice forming at any location in this piping is eliminated. Further, condensation, which normally forms on the outside of pipes filled with cold water which are located in an atmosphere warmer than the temperature of the water, is also eliminated. In addition, the problem of leakage is substantially eliminated since the piping is not subjected to long periods of static high pressure.

To accomplish these objectives, a special valve is employed, usually referred to as a dry pipe valve, the purpose of which is to normally block the flow of high pressure water at a predetermined inlet point to the fire protection sprinkler system, and to permit the passage therethrough of such water when conditions require the sprinkler system to operate. One type of valve which has been found particularly suitable for this type of service is the differential pressure valve in which a water clapper pivotally mounted in the valve body rests on a seat to block the flow of high pressure water through the flow passageway. The water clapper is retained in closed position by an interconnection with an air clapper which is pivotally secured to the valve body and which rests upon another seat located a short distance downstream from the aforementioned water clapper seat.

The air clapper is held closed by means of air pressure acting on its downstream face. It is to be noted that in a dry pipe installation, closed sprinkler heads are used which open automatically in the presence of heat. Thus, the entire piping system from the dry pipe valve to the sprinkler heads is sealed and a superatmospheric pressure can be maintained therein. The amount of air pressure maintained is small in relation to the pressure of the water due to the fact that the downstream face of the air clapper is considerably larger in area than the upstream face of the water clapper. Thus, a small air pressure produces a force more than sufficient to overcome the force of the water pressure resulting in the two clappers being maintained closed.

When one, or any number, of the sprinkler heads opens in response to the presence of heat, the pressure in the piping system is rapidly dissipated through the open sprinkler, the over-balance of forces shifts in the other direction, and the force now exerted by the water pressure is more than sufficient to push both clappers open permitting water to flow through the valve.

One of the main disadvantages of dry pipe valves heretofore is the difficulty encountered in changing a worn out sealing member or facing on the air clapper. It is customary to use a ring-like sealing member of planer or angular cross-sectional configuration, a part of which is gripped between a peripheral surface portion of the clapper body and a retainer ring suitably secured to the clapper body so that no leakage can occur around the facing. Frequently, screws are passed through suitable apertures in the retainer ring and the facing and are then received in threaded bores blind tapped into lugs formed on the clapper body for this purpose. To replace a worn or damaged facing, it is necessary that these screws be removed from the lugs, so that the retainer ring and facing can be removed from the clapper body.

When the occasion arises for replacement of the facing, it is frequently found to be impossible to remove these screws by usual methods. In order to obtain a good seal between the facing and the clapper body, it is necessary to provide a tight squeeze on the facing by the retainer ring; accordingly, when the valve is assembled at the factory, the screws are tightened to such an extent that they usually cannot be turned in the opposite direction and break off when forced. Also, it is not uncommon to find that the screws have become frozen in position due to corrosion or deposit build up resulting from salt or mineral conditions of the water, especially after prolonged periods of standing submerged in the priming water which is maintained in the valve at all times.

Because of these circumstances, when it is necessary to change the facing, the clapper presently must be removed from the valve body by disconnecting it at the hinge, and taken to a machine shop where the screws are drilled out and the screw holes retapped for new screws after the facing is replaced. Of course, during the time required for this procedure to be followed, the sprinkler system must be shut down.

It is immediately apparent that this procedure is costly in terms of effort expended and time consumed, and that the risk of loss due to fire is greatly increased during the time that the system is inoperative. One solution to this problem which has found some acceptance is the use of a ring-type facing having a U-shaped cross-section which seats in a peripheral groove formed in the outer edge of the clapper body. The ring has an internal diameter that is slightly smaller than the diameter of the groove so that the facing conforms to the surface of the groove in sealing relationship by virtue of its own resilience. It is installed and removed from the clapper body merely by grasping an edge thereof and stretching it to the extent necessary to slip it over an outer lip of the clapper body.

A major difficulty encountered with this type of seal, however, is that the sealing member is frequently at least partially washed out of the clapper groove by the high pressure stream of water which rushes through the valve body and impinges upon the facing during the initial opening phase of valve operation. As will be more clearly seen hereafter, the water clapper begins to open before the air clapper has been moved to its extreme open position, thus allowing a crescent shaped stream of water to impinge upon the air clapper facing with extremely high velocity caused by the combination of high pressure and a momentarily restricted opening through which it must pass. This stream of water has been found to have sufficient force to push the facing out of the seating groove over a substantial arc of its periphery, with the result that it becomes impossible for the clapper to properly reseat in the valve body without the facing first being replaced in its groove.

Prior art attempts to solve this problem have generally involved some type of mechanical retaining means, such as a ring which is bolted to the clapper body, or other mechanical retainers which fit within the facing and are intended to hold it in place. These solutions have not met with general favor for the reason that they either do not have sufficient strength to retain the facing in place against the force of the initial high velocity stream of water, or else they are susceptible to the aforementioned removal problems.

I have discovered that it is possible to divert this stream of water from impinging on the facing without altering any of the necessary flow characteristics of the dry pipe valve. Accordingly, to eliminate the above-mentioned problems encountered with prior art air clappers, I have designed a novel air clapper having a dam or deflector element integral with the clapper body which will deflect the stream of water initially entering the valve body at the moment of valve opening, and yet which will not act as an impediment to the normal flow of water through the flow passageway when the air clapper has swung to its full open position.

It is therefore, an object of the present invention to provide an improved air clapper for a fire protection sprinkler system dry pipe valve having a readily removable and replaceable resilient sealing member, and a deflecting member integral with the clapper body and positioned so as to deflect the initial stream of water passing through the valve body away from the sealing member and which nevertheless will still permit full and unimpeded flow through the valve body in accordance with the requirements of regulations governing the use of these valves.

Other objects and advantages of the present invention will become apparent from the detailed description which follows when considered in conjunction with the accompanying drawings.

In the drawings, in which the same reference numerals are used throughout the several views to indicate like parts:

FIGURE 2 is a front view of the dry pipe valve air clapper showing the improved facing and the effect thereon of the initial high velocity stream of water without the deflecting means of the present invention;

FIGURE 3 is a view similar to FIG. 2, but showing the clapper with the deflecting means;

FIGURE 4 is a fragmentary top view of the part of the clapper body which has the deflecting means thereon;

FIGURE 5 is a bottom view of the same portion of the clapper body as shown in FIG. 4;

FIGURE 6 is a sectional view taken along the line 6—6 of FIG. 5; and

FIGURE 7 is a sectional view taken along the line 7—7 of FIG. 5.

Figure 1:
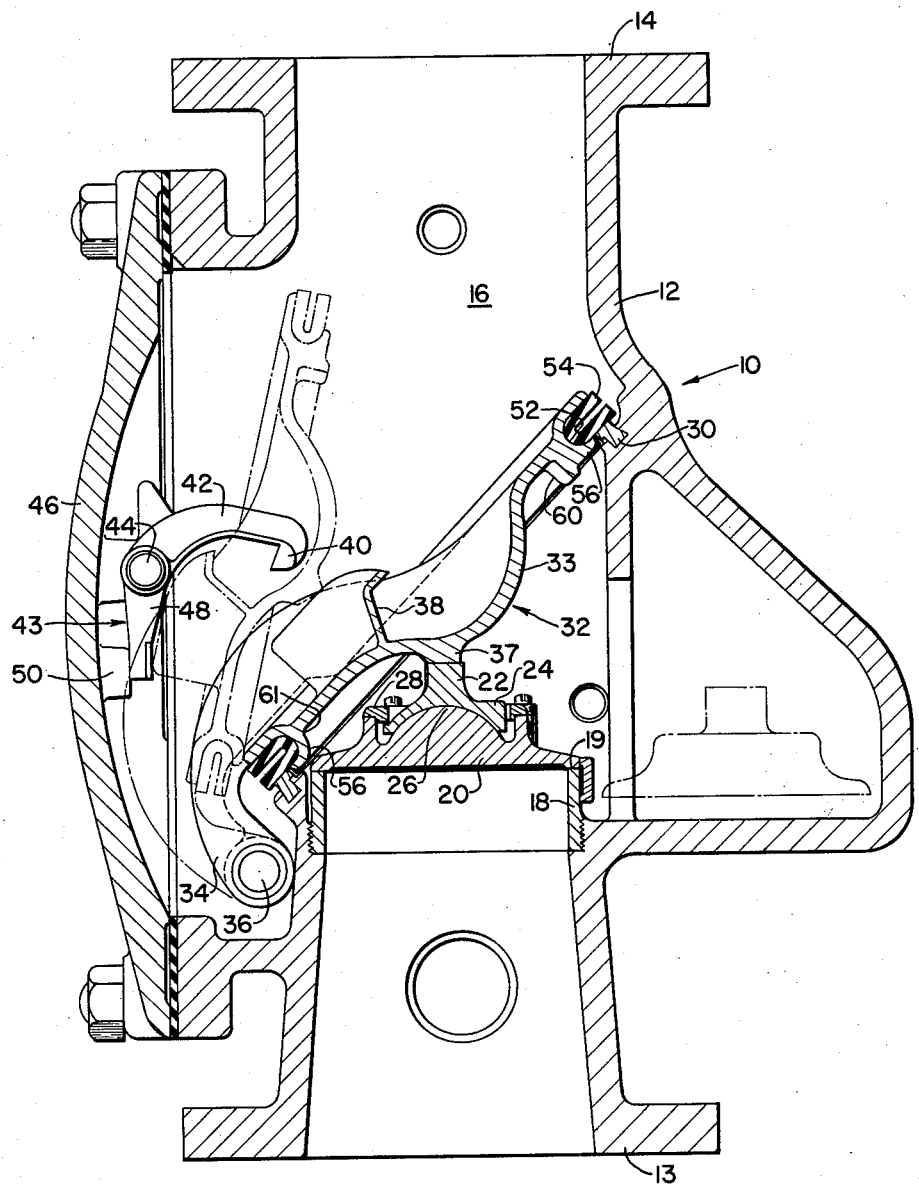
FIGURE 1 is a cross-sectional view through a dry pipe valve embodying the principles of the present invention and showing the clappers in closed position in full lines and in open position in dotted lines.

Referring now to FIG. 1 of the drawings, there is seen a dry pipe valve designated by the reference numeral 10 which consists of a generally tubular body member 12 having inlet and outlet ends 13 and 14 respectively and a substantially straight and unrestricted flow passageway 16 extending therethrough. A cylindrical bushing 18, threaded into a portion of the valve body 12, has an upper cylindrical surface 19 which serves as a seat for a water clapper 20, and which cooperates therewith to block the flow of water when the clapper 20 is in the position shown in full lines. The water clapper 20 is connected to a vertical hinge pin (not shown) and swings in a substantially horizontal plane to the open position indicated by dotted lines, as more fully described below. The water clapper 20 has a stud 22 which is integrally formed with a movable ball joint member 24, the latter being mounted for limited movement upon a fixed ball segment 26 and held in place by a retaining ring 28 for a purpose more fully described below.

Mounted above the water clapper seat 18 is an air clapper seat 30 which is cast into the valve body 12 and lies in a plane disposed at a relatively steep angle to the horizontal plane of the water seat 18. An air clapper, generally designated by the numeral 32, is adapted to make contact with the seat 30 to provide a second barrier in the flow line 16. The air clapper 32 comprises a generally circular clapper body 33 which has a pair of hinge arms 34 suitably affixed thereto. These arms are mounted on a horizontally disposed hinge pin 36 secured to the valve body 12 so that the air clapper can rotate about the pin 36 from the closed position shown in full lines to the open position indicated by dotted lines.

Centrally located on the upstream side of the clapper body 33 is a stud 37 which is adapted to cooperate in abutting relationship with the stud 22 of the water clapper 20 to hold the latter in its closed position.

Lying between the hinge arms 34 on the downstream side of the clapper body is a latching finger 38 which is adapted, in one position of movement of the clapper 32, to be engaged by the hook end 40 of a latching finger 42 to prevent the air clapper from reseating itself when the flow of water through the valve is stopped. This finger is part of a non-reseating latch lever 43 which is pivotally mounted on a pin 44 suitably secured to a removable plate 46 forming part of the valve body 12. On the opposite end of the latching lever 43 is an abutment arm 48, the end of which overlies a stop member 50 secured to the cover plate 46.

The clapper body 32 terminates radially outwardly in a peripheral groove 52, seen in greater detail in FIG. 2, formed by upper and lower lips 55 and 56 respectively, and which receives a sealing member or facing 54 in sealing relationship therewith. The facing 54 is substantially U-shaped in cross-section, and at least the lower arm thereof extends outwardly far enough beyond the lower lip 56, the latter being cut back somewhat from the upper lip, to overlie the air seat 30 and rest thereon. The facing is formed from any resilient material suitable for sealing purposes such as natural or synthetic rubber, resilient plastics, etc., and is applied to the clapper body by stretching it sufficiently so that it will slip over the lower lip 56 of the clapper body 32. When properly constructed the natural resilience of the material is sufficient to provide a seal between the contacting surfaces of the facing 54 and the groove 52.

The operation of the device as thus far described is as follows: the static condition of the valve is shown in FIG. 1 in solid lines, and in this condition the flow passageway 16 is filled with high pressure water from the inlet end 13 to the water clapper 20 which blocks further passage of the water. The water clapper is held on the seating surface 19 by abutting contact between the water clapper stud 22, and the air clapper stud 37; the air clapper 32 in turn is held on its seat 30 by air pressure which is maintained in the dry pipe section of the sprinkler system between the dry pipe valve and the closed sprinkler heads, and which exerts a force on the upper or downstream side of the clapper body 32 in proportion to the area of the air clapper. Since the air clapper 32 is much larger in area than the water clapper 20, a much lower air pressure than that of the water will suffice to maintain the air clapper closed against the opening force imposed by the water on the water clapper. The intermediate space between the two clappers is held at atmospheric pressure.

When a sprinkler head opens in response to the presence of heat, the resulting loss of pressure in the dry section of the system disturbs the static condition of forces acting on the air and water clappers, the force tending to maintain the air clapper closed gradually decreasing as the air pressure drops. The force imposed by the water pressure now exceeds that necessary to open the clappers, and does so by first moving the water clapper upwardly through the limited distance permitted by its hinge construction, which simultaneously moves the air clapper upwardly therewith due to the abutting relationship of studs 22 and 37. High pressure water now enters the intermediate chamber and begins to push the air clapper open to its dotted line position. Simultaneously with the movement of the air clapper, the water clapper tilts on its hinge (clockwise as viewed in FIG. 1) so that it is biased by the force of the water to swing in a substantially horizontal plane to the dotted line position shown in FIG. 1 but only after the air clapper has moved upwardly far enough to withdraw the air clapper stud 37 out of contact with the water clapper stud 22. The valve is now in its operating condition.

Suitably secured to the upstream side of the air clapper body, or formed integrally therewith, is a dam or deflector generally indicated as 60 in FIG. 1 and shown in greater detail in FIGS. 4–7. The deflector 60 comprises an arcuate element of substantially uniform thickness in the radial direction of the clapper 32, and is located in the peripheral corner 61 (FIG. 1) formed by the intersection of the upstream surface of the clapper body 33 and the adjacent curved outer surface of the lower lip 56. As indicated by the dotted line 62 (FIG. 6) the element 60 is somewhat triangular in cross-section if formed separately from the clapper 32; it should be noted, however, that if the deflecting element 60 is formed integrally with the clapper 32, its cross-section will blend with that of the clapper body 33 and lip 56 and be indistinguishable therefrom, as seen in FIG. 7.

The deflector element has an arcuate surface 63 disposed substantially perpendicularly to a plane extending radially from the center of the clapper body to the periphery thereof and extending a short distance below the plane of the lower surface of lip 56 to assure that the high pressure water impinging against this surface will be deflected away from the facing 54. It will be noted that the deflector 60 covers an arc of approximately 70°, with approximately 20° of that lying to one side of the longitudinal axis of the air clapper (see FIG. 6), and the other 50° lying on the opposite side thereof (see FIG. 7).

The positioning of the deflector is determined by the manner in which the high pressure water enters the intermediate chamber when the water clapper 20 first begins to open. As stated above, the initial movement of the water clapper 20 permitted by its hinge construction is a lateral twist or tilt about an axis which is perpendicular to the normally vertical axis of its hinge. This movement results in an opening which, momentarily, causes a fine, arcuate, somewhat quarter-moon shaped high velocity stream of water to enter the intermediate chamber, which, in the absence of the deflector 60, strikes the facing 54 in the region of the deflector with sufficient force to wash the facing out of its seating groove to approximately the extent and position indicated in FIG. 2. However, by the construction described above, this stream of water is deflected away from the facing 54 during the time required for the air clapper to move to its open position, in which position the facing is located so that there is no longer a tendency for the solid stream of water now flowing through the valve to wash it out of its seating groove.

It should be remembered that, while the principles of the invention have been described and illustrated as embodied in a dry pipe valve, these principles are, nevertheless, applicable to other types of valves, e.g. butterfly, gate, etc., wherein a sealing member is susceptible to being washed out of a seat by a high velocity stream of water passing by the movable valve member during the opening movement. Therefore, such deflecting means as are necessary to prevent the undesirable results of this stream of water are deemed to be within the scope of the invention.

It will be apparent from the foregoing description that there has been provided a valve which is believed to provide a solution to the problems, and to fulfill the objectives, hereinbefore set forth. It is to be understood, however, that the above description and accompanying drawings are to be deemed primarily as illustrative of the best mode presently contemplated of carrying out the principles of the invention; and that the device described and illustrated may be modified or altered in its form, proportions, detail of construction and arrangement of parts without departing from the spirit and scope of the invention as defined in the appended claims.

What I claim and desire to secure by Letters Patent is:

1. In a dry pipe valve having:
    (A) an elongate, substantially tubular valve body,
    (B) inlet and outlet openings in said body,
    (C) a flow passageway connecting said openings,
    (D) a pair of spaced apart valve seats serially arranged in said flow passageway,
    (E) a water clapper pivotally connected to said valve body for movement between a position of engagement with the upstream one of said seats and a position out of engagement therewith, and
    (F) an air clapper pivotally connected to said valve body for movement between a position of engagement with the downstream one of said seats and a position out of engagement therewith, said air clapper having
        (1) upper and lower parallel lips extending peripherally around said clapper and defining a peripheral outwardly facing groove therebetween, and
        (2) an annular resilient sealing member seated in said groove in sealing relationship therewith and adapted to contact said downstream one of said valve seats when said air clapper is in said position of engagement,
    the improvement which comprises
    (A) means on the upstream surface of said air clapper adjacent said lower lip for deflecting a stream of water passing through said valve body away from said sealing means to prevent said sealing means from being forced out of said groove by said stream of water.

2. In a dry pipe valve having
    (A) an elongate, substantially tubular valve body,
    (B) inlet and outlet openings in said body,
    (C) a flow passageway connecting said openings,
    (D) a pair of spaced apart valve seats serially arranged in said flow passageway,
    (E) a water clapper pivotally connected to said valve body for movement between a position of engagement with the upstream one of said seats and a position out of engagement therewith, and
    (F) an air clapper pivotally connected to said valve body for movement between a position of engagement with the downstream one of said seats and a position out of engagement therewith, said air clapper having
        (1) upper and lower parallel lips extending peripherally around said clapper and defining a peripheral outwardly facing groove therebetween, and
        (2) an annular resilient sealing member seated in said groove in sealing relationship therewith and adapted to contact said downstream one of said valve seats when said air clapper is in said position of engagement,
    the improvement which comprises
    (A) a deflecting means on said air clapper for deflecting a stream of water passing through said valve body away from said sealing member during at least a portion of movement of said clapper between said positions to prevent said sealing member from being at least partially withdrawn from said peripheral groove by said stream of water.

3. The combination as set forth in claim 2 wherein said deflecting means comprises a member having at least one face disposed perpendicularly to a plane extending radially from the center of said air clapper to the periphery thereof.

4. The combination as set forth in claim 3 wherein said face is arcuate in the circumferential direction of said air clapper and concentric with the circumference thereof.

5. The combination as set forth in claim 2 wherein said deflecting means comprises an arcuate member having a cross-section of generally triangular configuration, and having a face disposed perpendicularly to a plane extending radially from the center of said air clapper to the periphery thereof.

6. The combination as set forth in claim 5 wherein said member is disposed on the upstream surface of said air clapper adjacent said lower lip thereof.

7. The combination as set forth in claim 5 wherein said face is arcuate in the circumferential direction of said clapper and concentric with the circumference thereof, and is disposed on the radially inward side of said member whereby a stream of water impinging upon said surface is deflected away from said lower lip and said sealing member.

8. A valve comprising
   (A) a valve body defining a flow passageway,
   (B) a seat in said valve body,
   (C) a valve member movably mounted in said valve body for movement between a position of engagement with said seat and a position out of engagement with said seat,
   (D) resilient sealing means mounted in a groove around the periphery of said valve member and contacting said seat when said valve member is in said first mentioned position, and
   (E) means on said valve member for deflecting away from said sealing means a stream of fluid passing through said valve body as said valve member moves from said first mentioned position to said second mentioned position.

9. A valve comprising
   (A) a valve body defining a flow passageway therethrough,
   (B) a seat in said valve body,
   (C) a valve member in said valve body having
       (1) a removable peripheral resilient sealing member disposed in a groove therearound, and
       (2) being movably mounted for movement from a flow-blocking position of engagement with said seat to a flow-permitting position out of engagement with said seat in which latter position said sealing means is in the path of fluid flowing through said valve body, and
   (D) means on said valve member for deflecting said fluid flow around said sealing means to prevent said fluid flow from forcibly removing said sealing means from said valve member.

10. A valve as set forth in claim 9 wherein said deflecting means comprises an element integrally associated with said valve member, said element having a deflecting surface disposed in a plane substantially normal to the path of fluid flow as the latter approaches said sealing means.

References Cited in the file of this patent

FOREIGN PATENTS 316,488     Great Britain _____ Aug. 1, 1929